(12) United States Patent
Grupp et al.

(10) Patent No.: US 6,549,254 B1
(45) Date of Patent: Apr. 15, 2003

(54) BRAGG REFLECTION OPTICAL DEVICE AND METHODS FOR THE MANUFACTURING THEREOF

(75) Inventors: Joachim Grupp, Enges (CH); Peter Kipfer, Berneck (CH); Toralf Scharf, Neuchâtel (CH); Christian Bohley, Neuchâtel (CH); Rolf Klappert, Neuchâtel (CH); Hans Peter Herzig, Neuchâtel (CH)

(73) Assignee: Asulab S.A., Bienne (CH)

( * ) Notice: Subject to any disclaimer, the term of this patent is extended or adjusted under 35 U.S.C. 154(b) by 148 days.

(21) Appl. No.: 09/631,380

(22) Filed: Aug. 3, 2000

(30) Foreign Application Priority Data

Aug. 4, 1999  (EP) .............................. 99115390

(51) Int. Cl.$^7$ .......................................... G02F 1/1335
(52) U.S. Cl. .................. 349/115; 349/175; 349/176
(58) Field of Search ................... 349/96, 98, 104, 349/105, 113, 115, 175

(56) References Cited

U.S. PATENT DOCUMENTS

| | | | | |
|---|---|---|---|---|
| 5,193,015 A | * | 3/1993 | Shanks .................... | 359/53 |
| 5,691,789 A | * | 11/1997 | Li et al. .................... | 349/98 |
| 5,731,886 A | * | 3/1998 | Taber et al. ................ | 359/65 |
| 5,799,231 A | * | 8/1998 | Gates et al. ................ | 349/115 |
| 5,847,798 A | * | 12/1998 | Yang et al. ................. | 349/169 |
| 5,948,831 A | * | 9/1999 | Broer et al. ................ | 522/182 |
| 6,061,108 A | * | 5/2000 | Anderson et al. ........... | 349/98 |
| 6,099,758 A | * | 8/2000 | Verall et al. ............... | 252/585 |
| 6,317,189 B1 | * | 11/2001 | Yuan et al. ................. | 349/176 |

FOREIGN PATENT DOCUMENTS

EP          872 759          10/1998

* cited by examiner

*Primary Examiner*—Robert H. Kim
*Assistant Examiner*—Hoan Nguyen
(74) *Attorney, Agent, or Firm*—Sughrue Mion, PLLC

(57) ABSTRACT

An optical device (20) is provided using at least one film (23) of cholesteric liquid crystal to reflect at least one predetermined wavelength band from an incident light. This device is characterized in that a non zero birefringence gradient is present in a portion or the entire thickness of said film. The gradient may be obtained in particular by superposing layers (24a–24j) having increasing or decreasing respective birefringence coefficients. The birefringence gradient has the effect of removing the lateral bands of the reflection spectrum, hence making the color of the reflected light more brilliant and more saturated. The effect is particularly advantageous in the case of the color red, for which the lateral band located on the yellow side is perceived strongly by the human eye.

20 Claims, 4 Drawing Sheets

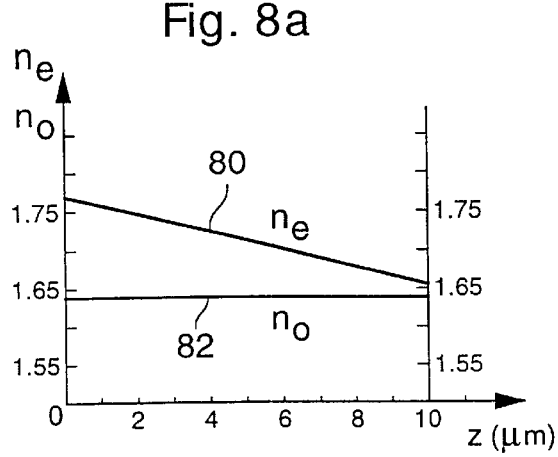
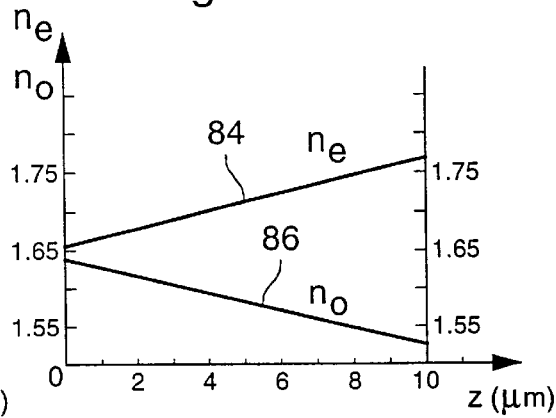
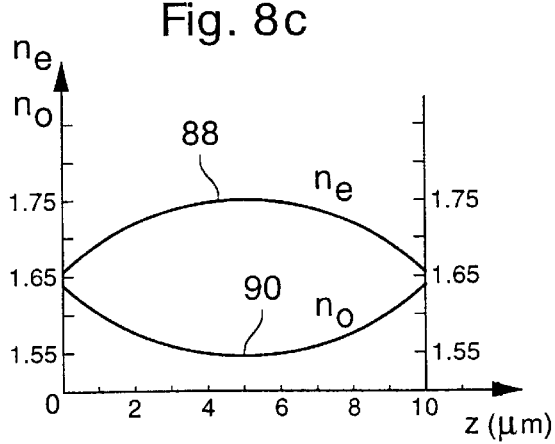
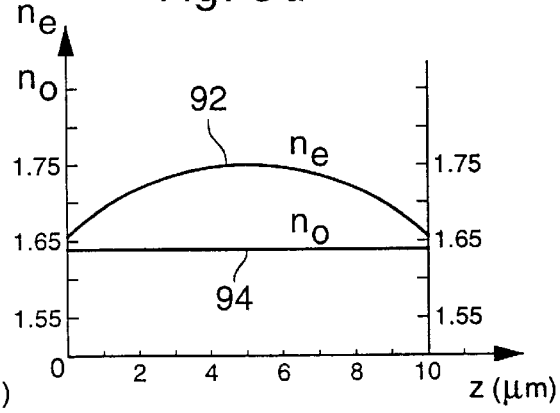
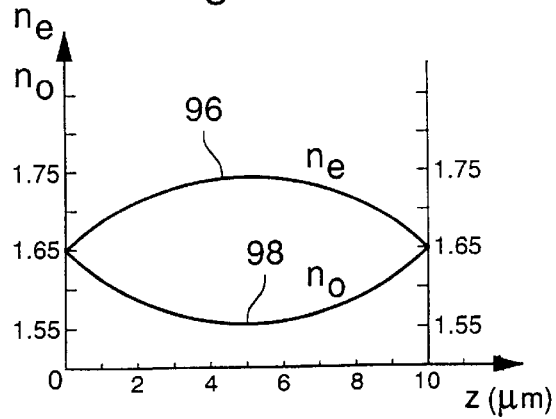

BRAGG REFLECTION OPTICAL DEVICE AND METHODS FOR THE MANUFACTURING THEREOF

BACKGROUND OF THE INVENTION

The present invention concerns a Bragg reflection optical device for reflecting at least one predetermined wavelength band present in an incident light, the device including at least one liquid crystal film of the cholesteric type. The invention also concerns methods for manufacturing such optical devices.

It will be recalled that a cholesteric type liquid crystal only reflects, by Bragg reflection, light which has circular polarisation having the same rotational direction as that of the liquid crystal. It will be noted that, in the following description, the reflection coefficient is equal to 1 when a circular polarisation light is completely reflected.

The characteristic of certain cholesteric liquid crystals is having a helical periodic structure having a pitch which can be adjusted. This helical structure causes Bragg reflections whose reflection band, i.e. the wavelength range which it can reflect, can easily be modified by selecting other values for the helical pitch and/or the liquid crystal birefringence.

From such crystals, one can make optical devices, in particular for display, by introducing, between two plates or substrates, several cholesteric liquid crystals having one more pitches adjusted to reflect respectively a wavelength corresponding to a determined colour.

One problem which is commonly encountered when such devices are made lies in the fact that the reflected colour, in particular the colour red, has a dull or faded appearance.

In order to explain this phenomenon, reference will be made hereinafter to FIG. 1, which shows a curve 1 illustrating the reflection spectrum of an optical device with cholesteric liquid crystals adjusted to reflect the colour red. It is to be noted that reflection of wavelengths λ corresponding to the colour red by such a liquid crystal is imperfect. Indeed, curve 1 can be broken down into a main band A, corresponding to reflection of the colour red, and into two lateral bands B and C on either side of main band A. The effect of the presence of lateral bands B and C is that the colour red reflected by the optical device is not pure, i.e. it is not sufficiently saturated, nor sufficiently brilliant.

It will be recalled that saturation is linked to the limitation of the wavelength spectrum of the colour red, and that brilliance is linked to the whether the reflection coefficient is close to 1 or not.

Moreover, the characteristic of the human eye will accentuate the undesirable effect of these lateral bands on the purity of the red colour which it sees. FIG. 1 shows a curve 2 illustrating the response of the human eye as a function of the wavelength λ of the light which the eye receives, i.e. for all the colours of the visible spectrum (this curve also being called the photopic curve). It will be noted that the human eye is most sensitive in day vision (photopic vision) to the wavelengths λ closes to wavelength 555 nm, which corresponds to the peak of curve 2.

FIG. 2 shows a curve 3 illustrating the eye's perception of the colour red reflected onto the optical device having the feature shown in curve 1. In other words, FIG. 2 shows the reflection spectrum of the colour red multiplied by the human eye's response, as a function of wavelength λ. It will be noted in FIG. 2 that the effects of lateral band C of the low wavelengths of the colour red are amplified by the human eye, which adversely affects the colour red and gives it a dull appearance; it then becomes orange-red.

It has been observed that similar phenomena occur with the colour blue. However, the effects of the lateral bands are more amplified for the colour red than for the colour blue, because of the photopic curve of the human eye.

In order to overcome this problem of the purity of colour emitted by an optical device of the aforementioned type, there exist several types of solution in the prior art.

A first solution to this purity problem is described in the work entitled "Liquid Crystal in Complex Geometries" by Taylor and Francis, published in 1996, page 257, and consists in doping the liquid crystal with a dye which is intended to absorb the undesired parts of the reflection spectrum.

One drawback of the first solution is that the optical effect obtained is not optimum. Indeed, it is possible for the light reflected by the liquid crystal not to have met molecules of dye or to only have been modified by a few dye molecules, so that the colour is unsaturated, or, in other words, is not pure.

Another drawback of this solution is that it requires the mixture of the liquid crystal and the dye to be physically separated from other liquid crystals which reflect respectively green and blue, in order to avoid diffusion of the dye molecules in the neighbouring liquid crystals of different colours. This has the effect of increasing the complexity of the device.

Another drawback lies in the fact that the dye has residual absorption for the wavelengths of the main band, which has the effect of reducing brilliance.

Another drawback lies in the fact that this solution involves absorption of the transmitted light, which means that a stack of several liquid crystal cells cannot be used to combine optical effects, for example different colours.

Another drawback lies in the poor chemical stability of the molecules forming the dye, in particular in the presence of ultraviolet rays (UV), which reduces the reliability and lifetime of the display device.

A second solution to the aforementioned purity problem is described in European Patent Application No. EP 0 872 759, in the case of a liquid crystal display device (LCD). This solution consists in providing the LCD device with a filter able to absorb the visible wavelengths different to that corresponding to the colour that the crystal has to reflect. This filter eliminates the effect of the lateral bands described above from the spectrum reflected by the liquid crystal, so as to make the reflected colour more pure.

This second solution also has various drawbacks. It requires the complex arrangement of the absorbent filter, which goes against the usual industrial concerns as to cost, compactness and rationality. Moreover, it requires the arrangement of equalising layers to allow a constant thickness of the liquid crystals to be assured over the entire surface of the cell, which increases the complexity of such a device.

This solution also has the drawback of involving absorption of the transmitted light, which means that a stack of several liquid crystals cannot be used to combine their optical effects.

SUMMARY OF THE INVENTION

An object of the present invention is thus to provide an optical device which overcomes the aforementioned drawbacks, in particular an optical device able to reflect or transmit with optimum purity a predetermined colour having a wavelength comprised within the visible range, for example the colour red, or outside such range, for example infrared rays.

Another object of the present invention is to provide a device able to reflect or transmit a predetermined colour with optimum saturation.

Another object of the present invention is to provide a device able to reflect or transmit a predetermined colour the brilliance of which is optimum.

Another object of the present invention is to provide an optical device allowing a plurality of colours to be reflected to transmitted.

Another object of the present invention is to provide an optical device answering the usual concerns in the industry as to cost, compactness and rationality.

According to the invention, an optical device of the type indicated in the preamble is provided, characterised in that the liquid crystal film has, in at least part of its thickness, a birefringence gradient as a function of the depth in said film.

One advantage of the birefringence gradient liquid crystal of such an optical device is that it can limit the reflection spectrum to a wavelength band having very clear limits with neighbouring wavelengths, and it makes the reflection coefficient close to 1. As a result, the band reflected by the optical device is both more brilliant and more saturated, i.e. more pure. Likewise, the non-reflected light can be transmitted through the optical device with great purity.

The birefringence gradient may be negative or positive, the birefringence being respectively decreasing or increasing as a function of the depth counted from the face of the film receiving the incident light. In other words, the effect of removing the lateral bands is obtained in both directions for the light passing through the liquid crystal film.

The birefringence gradient may be constant or variable as a function of the depth counted from the face of the film receiving the incident light.

In a particular embodiment, the film is formed by a plurality of polymerised layers of a cholesteric type liquid crystal able to reflect said predetermined wavelength band, these layers having constant birefringence coefficients, which differ from one layer to another, and ordered gradually so as to form said birefringence gradient.

Generally, the extraordinary refractive index $n_e$ may or may not vary linearly as a function of depth z, while the ordinary refractive index $n_o$ may be constant or variable.

In another embodiment, the optical device includes a cell containing said liquid crystal film, said cell including first and second substrates and a sealing frame which delimit a cavity containing said film. This device may further includes two groups of electrodes arranged respectively on either side of the film and a control circuit connected to said electrodes arranged to provide them selectively with control voltages, so as to cause the liquid crystal to switch from a first state, in which it reflects the light of said band, into a second state in which it is transparent to said light, or vice versa.

In the two aforementioned embodiments, said device can include a stack of a plurality of said liquid crystal films, each of said films being arranged to reflect the light of a different wavelength band.

The present invention also concerns a method for manufacturing an optical device formed by a plurality of polymerised layers as indicated above. This method includes the steps of:

providing a substrate;

depositing on the top surface of said substrate a first layer of polymerisable cholesteric liquid crystal having a first birefringence coefficient and reflecting a predetermined wavelength band, and polymerising said first layer;

depositing and polymerising, in succession on the preceding layer, superposed layers of polymerisable cholesteric liquid crystal reflecting said predetermined wavelength band and having respective birefringence coefficients which vary gradually with respect to that of the preceding layer, so as to form said film by a stack of layers together having a birefringence gradient in the thickness of the film.

The present invention also concerns a method for manufacturing an optical device including a cell as indicated above. This method includes steps of:

manufacturing a liquid crystal cell containing a film formed of a mixture comprising: an agent filtering ultraviolet radiation, a first cholesteric liquid crystal having a first birefringence coefficient and reflecting a predetermined wavelength band, and a second cholesteric liquid crystal having a second birefringence coefficient different from said first birefringence coefficient and reflecting said predetermined wavelength band;

generating polymerisation of the second liquid crystal in a top portion of the film by irradiating said mixture by ultraviolet radiation from a top face of the cell, so that the second liquid crystal is mostly fixed in said top portion by polymerisation and so that its concentration decreases with the depth in the film.

Such a partial segregation method via polymerisation varying with the depth is known in particular from European Patent No. EP 606 940 and U.S. Pat. No. 5,691,789, but in manufacturing methods using a mixture of two liquid crystals having different pitches, and not different birefringence. Indeed, in these methods the object is the manufacture of cholesteric polarisers which have a cholesteric helix pitch gradient in order to offer a much greater band width than that of the prior art. This intrinsically goes against the object of the present invention, which aims to limit precisely the band width of the optical device. However, the polymerisation methods which decrease progressively with the depth which are mentioned in these prior publications can be used to implement the invention disclosed here.

BRIEF DESCRIPTION OF THE DRAWINGS

Other features and advantages of the present invention will appear more clearly upon reading the detailed description of two preferred embodiments of the invention, given solely by way of example, with reference to the annexed drawings, in which:

FIGS. 8a to 8e show third, fourth, fifth, sixth and seventh birefringence profiles relating to FIGS. 3 and 5.

DETAILED DESCRIPTION OF THE INVENTION

Figure 1:
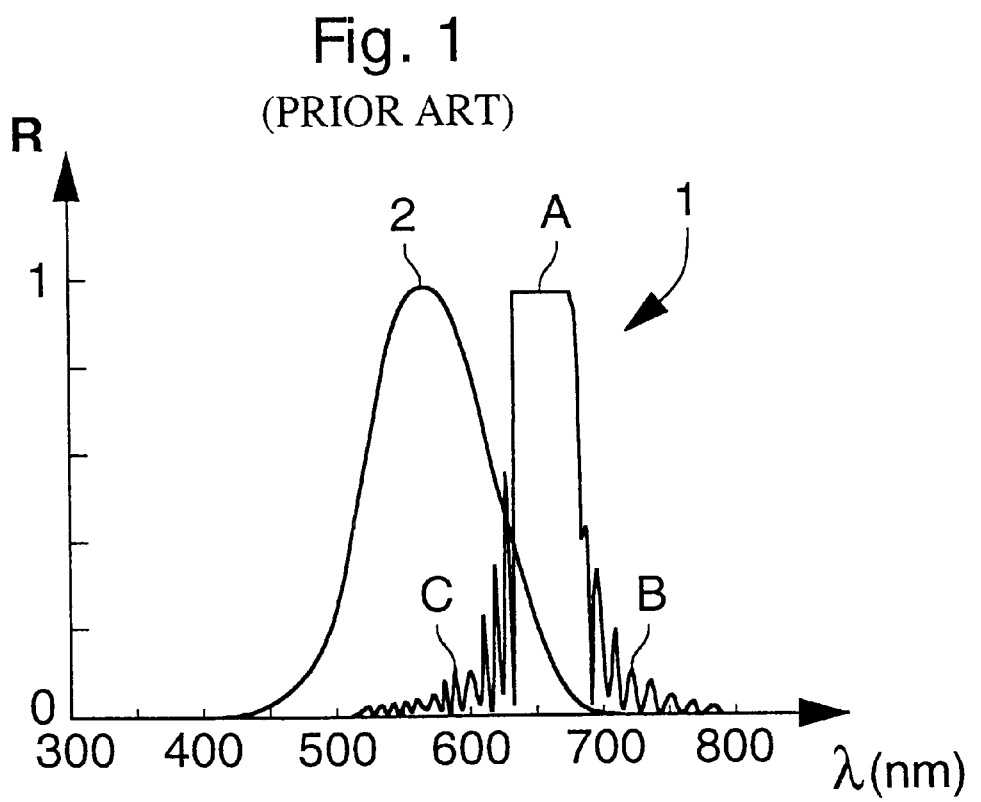
FIG. 1 cited above shows the reflection spectrum of a conventional Bragg reflector able to reflect the colour red, as well as the photopic curve of the human eye.
Figure 2:
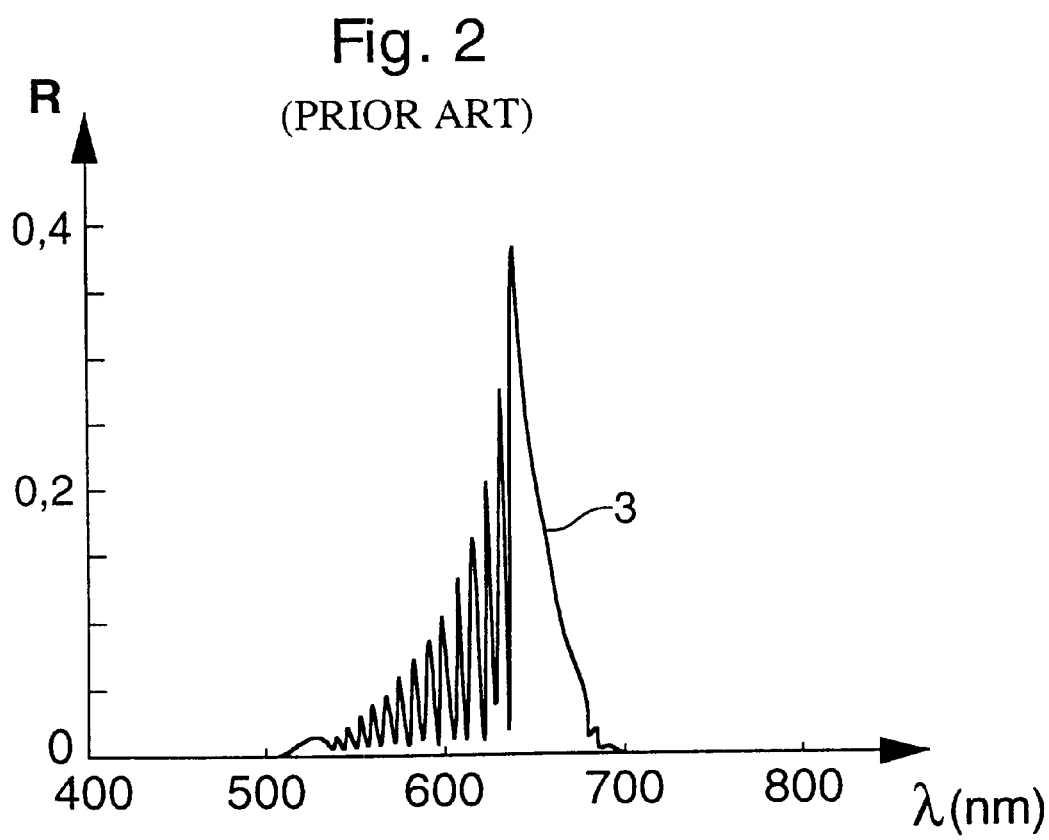
FIG. 2 cited above shows the reflection spectrum of FIG. 1 multiplied by the photopic response of the human eye.

Those skilled in the art will note that the present invention can be applied in a large number of optical devices. By way of example, two preferred embodiments will be described hereinafter, respectively an optical filter and a Bragg reflector.

The first embodiment will be described with reference to FIG. 3 which shows an optical filter 20.

Optical filter 20 includes a transparent substrate 22 and a liquid crystal film 23 formed of a plurality of liquid crystal polymer layers 24a to 24j formed by polymerisation, these crystals being able to reflect a predetermined wavelength band, corresponding for example to the colour red. It goes without saying that the number of polymer layers is cited solely by way of example. In the example shown in FIG. 3, layers 24a to 24j are stacked one on top of the other, so that the bottom surface 25 of layer 24j is in close contact with the top surface of substrate 22, and the top surface 26 of layer 24a receives incident light symbolised by arrows L in FIG. 3. Substrate 22 can be made of glass or plastic material. Since substrate 22 is transparent, optical filter 22 transmits downwards all the incident light L, except the band reflected upwards by Bragg reflection.

Figure 4:
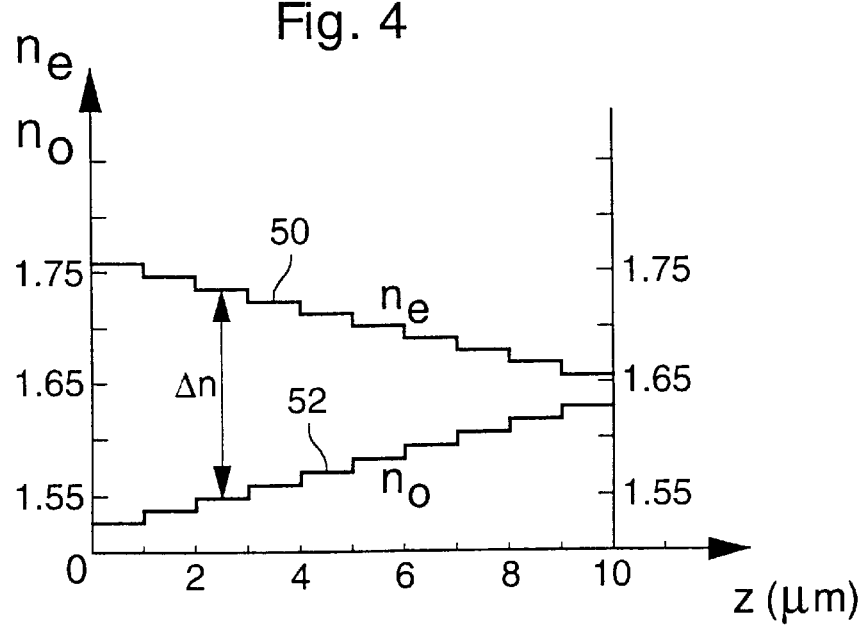
FIG. 4 shows a first birefringence profile related to FIG. 3.

Layers 24a to 24j are formed so as to have constant birefringence coefficients, but which differ from one layer to another, so that a non zero birefringence gradient is present in the thickness of film 23. FIG. 4 shows a first birefringence profile Δn relating to film 23 as a function of the depth z in the film. More precisely, FIG. 4 shows a curve 50 illustrating the profile of extraordinary refractive index $n_e$ and a curve 52 illustrating the profile of ordinary refractive index $n_o$, as a function of depth z. It will be recalled that birefringence Δn is defined by $\Delta n = n_e - n_o$. Curves 50 and 52 are step functions which are respectively decreasing and increasing with depth z, so that the birefringence decreases with the depth, i.e. has a negative gradient as a function of the depth. In other words, film 23 is very birefringent at the surface (i.e. at z=0) and less birefringent with the depth. By way of example only, in relation to FIG. 4, the birefringence has a value 0.23 for z=0 and decreases by 0.023 per μm of depth.

Layers 24a to 24i can be formed in accordance with a manufacturing method of the type used to make a liquid crystal having a global refractive index profile which varies by steps with depth z. Such a method is described in the literature relating to the technical field of the invention, in particular in European Patent Application No. EP 0 881 509 which discloses a stratified polariser formed of several layers of polymerised cholesteric liquid crystals having different wavelengths of reflected light. Essentially, with reference to FIG. 3 annexed hereto, the method for manufacturing film 23 includes the steps consisting in: depositing on the top surface of substrate 22 a first monomer layer of cholesteric liquid crystals having a first birefringence value; polymerising the first layer to form layer 24j; and forming in succession layers 24i to 24a in a similar manner to layer 24j, but with liquid crystals having gradually lower respective birefringence values, so that layers 24a to 24j form film 23 with birefringence values having a profile such as that shown in FIG. 4. In a variant, the layers can also be deposited with an increasing birefringence or which varies according to any law.

It is to be noted that the manufacturing method disclosed in European Patent Application No. EP 0 881 509 is implemented for an opposite purpose to that of the present invention. Indeed, in this document, the reflection bands are widened to reflect the whole spectrum of the visible field, this reflection being achieved by a cholesteric structure pitch gradient.

It was explained above that, by selectively reflecting a wavelength band, filter 20 lets all the rest of the incident light spectrum L pass. It can be thus understood that it is possible to superpose several elementary filters of the same type, but each reflecting another wavelength band, to form a composite optical filter which reflects the shape of the elementary filter reflection spectra and transmits substantially all the other wavelengths of the incident light spectrum. A "made to order" and well defined transmission spectrum is obtained, as a result of the clear break between the reflected wavelengths and the wavelengths transmitted by each elementary filter.

It is important to note that the effect of removing the lateral bands in the reflected light also exists if incident light L comes from below, in the case of FIG. 3, i.e. when the birefringence gradient is positive as a function of the depth. This also means that index profiles 50 and 52 of FIG. 4 could be reversed from left to right and provide the same optical result. In other words, bottom layer 24j could have the greatest birefringence and top layer 24a the lowest birefringence.

It is also to be noted that optical filter 20 performs the colour selection function, i.e. the same function as a coloured polariser, without it being necessary to use a circular polariser, the cholesteric structure of film 23 performing a circular polarisation selection of the incident light.

Figure 3:
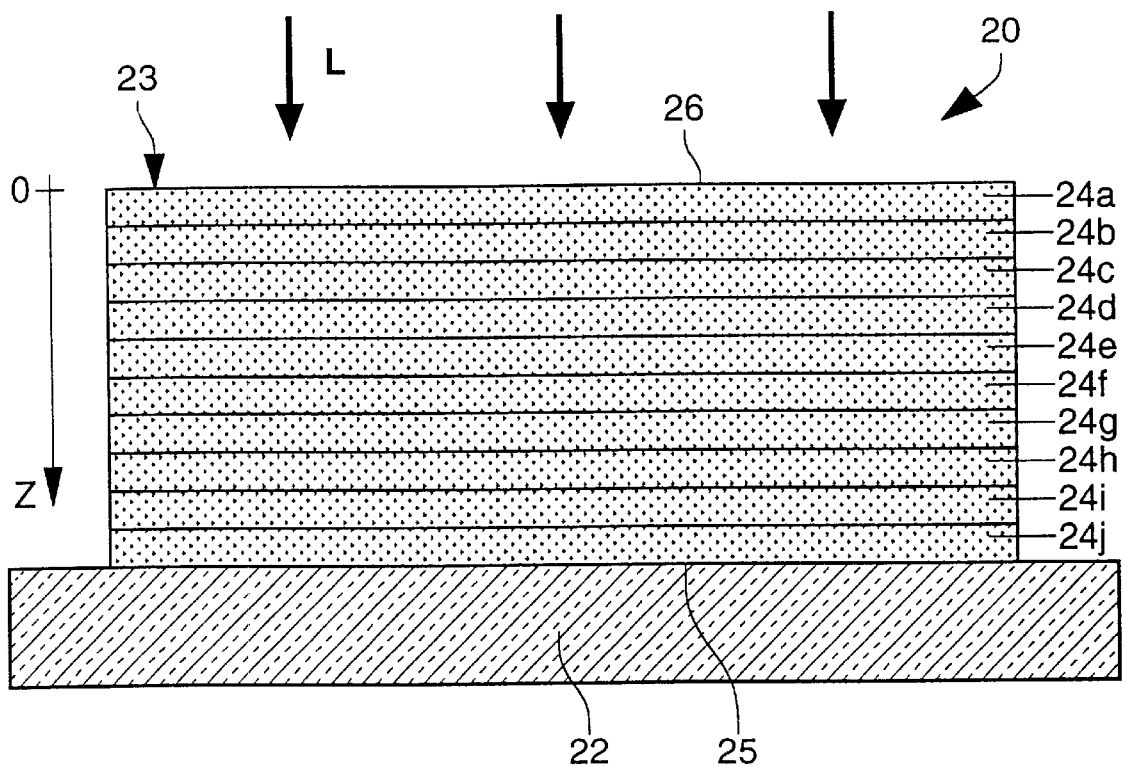
FIG. 3 shows a first embodiment of the optical device according to the present invention.

It should be noted that the optical device shown in FIG. 3 can also constitute a reflector. In such case, it would be advantageous to place a reflective layer on top surface 25 of substrate 22.

A second embodiment will now be described, in relation to FIG. 5, which shows a liquid crystal cell constituting a Bragg reflector 30.

Reflector 30 includes a first transparent substrate 32 arranged on front side, i.e. on the side which receives incident light symbolised by arrows L, and a second substrate 34 arranged on a back side so that substrate 34 extends facing substrate 32 and parallel thereto.

Substrates 32 and 34 may be made of glass or a plastic material, substrate 34 being able to be opaque, for example black. Substrate 34 may also, as is shown in FIG. 5, be covered with a light absorbing layer 43, for example a black layer arranged on the face of substrate 34 situated facing substrate 32. In another embodiment, layer 43 may be reflective.

Substrates 32 and 34 are connected via a sealing frame 36 in order to delimit between them a cavity to contain a film 38 of liquid crystals (CL) of the cholesteric type. Film 38 is formed of a mixture of liquid crystals and chiral polymers, formed so that a non zero birefringence gradient is formed in the thickness of film 38 as a function of the depth.

Figure 6:
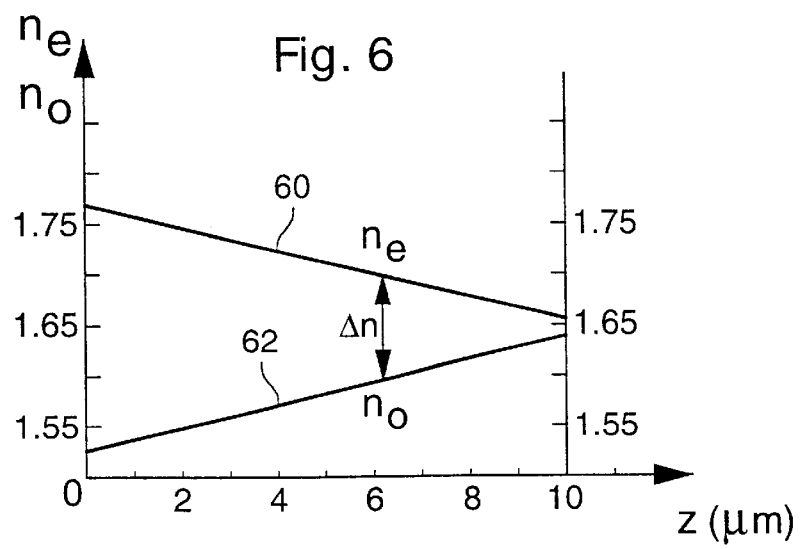
FIG. 6 shows a second birefringence profile relating to FIGS. 3 and 5.

FIG. 6 shows an example of birefringence profile Δn having a negative gradient as a function of depth z in film 38. More precisely, FIG. 6 shows a curve 60 illustrating the profile of extraordinary refractive index $n_e$ and a curve 62 illustrating the profile of ordinary refractive index $n_o$ as a function of depth z. Curves 50 and 52 are respectively decreasing and increasing functions with depth z so that liquid crystal CL is very birefringent at top surface 39 of film 38 (i.e. at z=0) and less birefringent in depth. By way of example only, in relation to FIG. 6, the birefringence has a value 0.23 for z=0 and decreases by 0.023 per μm of depth.

Film 38 may be formed according to a manufacturing method using a mixture comprising: an agent filtering UV radiations; a first cholesteric liquid crystal of low birefringence, and a second cholesteric liquid crystal of high birefringence (i.e. having a substantially higher birefringence than that of the first liquid crystal) in the form of a polymerisable monomer, for example at ultraviolet radiation. In this mixture placed in the cavity of reflector 30, polymerisation of the second liquid crystal is caused by UV rays coming from above the reflector. Given that the polymerisation decreases with depth z because of the presence of the filtering agent, the monomer of the second liquid crystal tends to become rarefied in the top portion of the film, thus to rise by diffusion and polymerise in greater quantity where the depth is low. There results a gradient in the second polymerised cholesteric liquid crystal content in the top portion of the film (i.e. near the surface), which creates a similar birefringence profile to that of FIG. 6.

Figure 7:
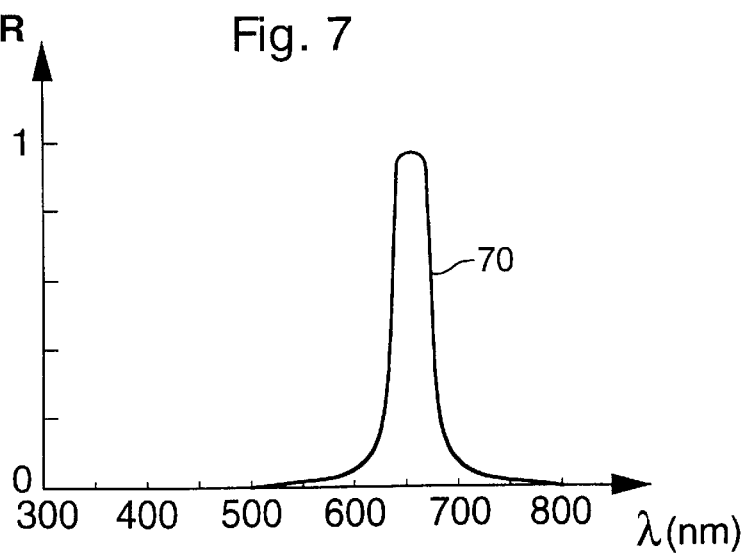
FIG. 7 shows the reflection spectrum of an optical device according to FIG. 3 or 5.

By way of illustration, from digital simulations, the reflection spectrum of reflector 30 has been calculated. This spectrum is shown by curve 70 in FIG. 7. It is to be noted that curve 70 no longer includes lateral bands (unlike curve 1 of FIG. 1) and is centred on a wavelength of 650 nm, i.e. substantially that of the colour red. The edges of the reflection peak are almost vertical, which assures great purity of colour. It is also to be noted that the reflection coefficient corresponding to the wavelength of the colour red is substantially equal to 1, which results in optimum brilliance in the reflected colour red.

In other words, it has been observed that the birefringence gradient present in the depth of film 38 has the effect of limiting the reflection spectrum to the range of wavelengths of the desired colour (i.e. the colour red in the example of FIG. 5) and of making the reflection coefficient close to 1. As a result the desired colour reflected by reflector 30 is both more saturated and more brilliant, i.e. purer.

It has also been calculated that there exists a minimum birefringence gradient beyond which the quality of reflector 30 is substantially improved. For example, in the event that the birefringence gradient is present over 10% of the thickness of film 38, the minimum birefringence gradient is approximately $0.1/\mu m$ and in the event that the birefringence gradient is present over the entire thickness of film 38, the minimum birefringence gradient is approximately $0.01/\mu m$. For the intermediate cases, the minimum gradient value may be interpolated as a function of the thickness in which it is present.

It is to be noted that reflector 30 performs the same colour selection function as a coloured polariser, without it being necessary to use a circular polariser, since the cholesteric surface of cell 38 performs a circular polarisation selection of the incident light.

Figure 5:
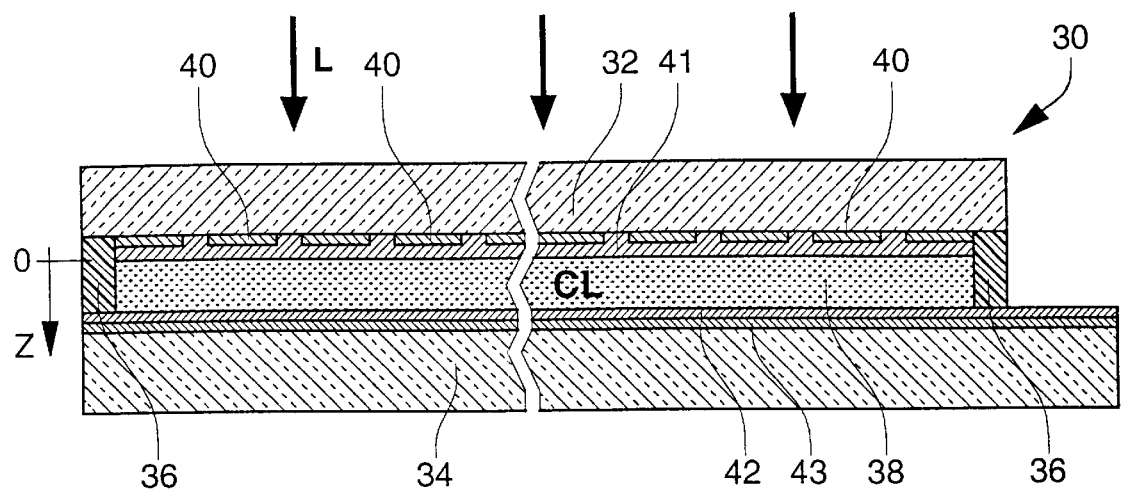
FIG. 5 shows a second embodiment of the optical device according to the present invention.

By way of variant a switchable cell reflector can be made from reflector 30, as shown in FIG. 5. For this purpose, liquid crystal CL is controlled so as to have at least two states, i.e. a first state in which it reflects the light of a wavelength range corresponding to a predetermined colour, for example the colour red, and a second state in which it is transparent to light.

The surface of substrate 32 turned towards substrate 34 carries a first group of electrodes 40. The surface of substrate 34 turned towards substrate 32 includes a second group of electrodes 42 arranged, for example, in the form of strips perpendicular to electrodes 40. Each of electrodes 40 and 42 may be formed by a transparent conductive strip deposited and structured by conventional techniques and preferably made of indium-tin oxide (ITO). Reflector 30 is connected to in a known manner to a control circuit for electrodes 40 and 42, this circuit being able to provide suitable control voltages to selected electrodes to modify the optical conditions of the liquid crystal located at the crossing point of electrodes 40 and 42 being considered, i.e. to switch it into one of its two states described above, or into an intermediate state between these two states.

By way of improvement and as shown in FIG. 5, the switchable cell of reflector 30 may include an alignment layer 41 arranged between film 38 and electrodes 40. One advantage of such an arrangement of alignment layer 41 is that it forms a dielectric barrier necessary for the reliability of switchable cell reflector 30.

It goes without saying for those skilled in the art that the above description may undergo various modifications without departing from the scope of the present invention.

By way of variant, the cell of the optical device may be formed so as to reflect a colour in the visible field other than the colour red, for example the colour blue, or rays outside the visible field, for example infrared rays.

By way of alternative embodiment, a film having a non-zero birefringence gradient present either in a portion, or in the whole of the thickness of the film, can be formed, according to one of the birefringence profiles shown in FIGS. 8a and 8e.

FIG. 8a illustrates a third birefringence profile represented by a curve 80 relative to refractive index $n_e$ and a curve 82 relative to refractive index $n_o$. It is to be noted that curve 80 is a function decreasing with depth z, and that curve 82 is a function constant with depth z. There results a birefringence gradient, the birefringence being maximum at the top of film 38 (i.e. at z=0).

FIG. 8b illustrates a fourth birefringence profile represented by a curve 84 relative to index $n_e$ and a curve 86 relative to index $n_o$. It is to be noted that curve 84 is an increasing function with depth z, and that curve 86 is a decreasing function with depth z. There results a birefringence gradient, the birefringence being maximum at the bottom of film 38 (i.e. at z=10 $\mu m$).

FIG. 8c illustrates a fifth birefringence profile represented by a curve 88 relative to index $n_e$ and a curve 90 relative to index $n_o$. It is to be noted that curve 88 corresponds to a positive sinusoidal alternation with depth z, and that curve 90 corresponds to a negative sinusoidal alternance with depth z. There results a birefringence gradient, the birefringence being maximum in the middle of film 38 (i.e. at z=5 $\mu m$) and minimum close to the faces of the film.

FIG. 8d illustrates a sixth birefringence profile represented by a curve 92 relative to index $n_e$ and a curve 94 relative to index $n_o$. It is to be noted that curve 92 corresponds to a positive sinusoidal alternation with depth z, and that curve 94 is a constant function with depth z. There results a birefringence gradient, the birefringence being maximum in the middle of film 38 (i.e. at z=5 $\mu m$).

FIG. 8e illustrates a seventh birefringence profile represented by a curve 96 relative to index $n_e$ and a curve 98 relative to index $n_o$. It is to be noted that curve 96 corresponds to a positive sinusoidal alternation with depth z, and that curve 98 corresponds to a negative sinusoidal alternance with depth z, indices $n_e$ and $n_o$ having the same values at z=0 $\mu m$ and at z=10 $\mu m$, i.e. at the two faces of film 38. The birefringence thus has a variable gradient and it is maximum in the middle of film 38 (i.e. at z=5 $\mu m$).

Also by way of variant, a stack of optical films according to the invention may be made, each of these devices being able to select a predetermined band by Bragg reflection, so that the stack can reflect several predetermined wavelength bands, since the light of a band reflected by a film placed in a bottom position (if the incident light comes from above) could pass through a film placed higher which does not reflect in this band. By a judicious combination of the various reflection bands of the different films, any desired reflection spectrum may be created, as well as a transmission spectrum which corresponds to the incident light spectrum less the reflection spectrum bands.

What is claimed is:

1. A Bragg reflection optical device for reflecting at least one predetermined wavelength band present in an incident light, the device including at least one film of cholesteric type liquid crystal, wherein said liquid crystal film has, in at least a portion of its thickness, a birefringence gradient as a function of the depth in said film.

2. An optical device according to claim 1, wherein said film is formed by a plurality of polymerised layers of a cholesteric type liquid crystal able to reflect said predetermined wavelength band, said layers having constant birefringence coefficients, which differ from one layer to another and ordered gradually so as to form said birefringence gradient.

3. An optical device according to claim 1, comprising a cell including said liquid crystal film, said cell including first and second substrates and a sealing frame which delimit a cavity containing said film.

4. An optical device according to claim 3, wherein said film includes a mixture of first and second liquid crystals having different birefringence, one of said liquid crystals being fixed by polymerisation in said film so as to be present with a concentrations which varies with said depth.

5. An optical device according to claim 3, further including two groups of electrodes arranged respectively on either side of said film and a control circuit connected to said electrodes and arranged to supply them selectively with control voltages, so as to cause the first liquid crystal to switch from a first state, in which it reflects light from said band, to a second state in which it is transparent to said light, or vice versa.

6. An optical device according to claim 1, wherein said birefringence gradient is negative, the birefringence decreasing as a function of the depth counted from the face of the film receiving said incident light.

7. An optical device according to claim 6, wherein said film has an extraordinary refractive index which decreases as a function of said depth.

8. An optical device according to claim 7, wherein said film has a constant ordinary refractive index.

9. An optical device according to claim 6, wherein said film has an ordinary refractive index which increases as a function of said depth.

10. An optical device according to claim 1, wherein said birefringence gradient is positive, the birefringence increasing as a function of the depth counted from the face of the film receiving said incident light.

11. An optical device according to claim 10, wherein said film has an extraordinary refractive index which increases as a function of said depth.

12. An optical device according to claim 10, wherein said film has an ordinary refractive index which decreases as a function of said depth.

13. An optical device according to claim 1, wherein said birefringence gradient varies as a function of the depth counted from the face of the film receiving said incident light.

14. An optical device according to claim 13, wherein the birefringence is maximum in the middle of the thickness of said film and minimum or zero close to faces of the film.

15. The optical device according to claim 1, wherein the absolute value of said birefringence gradient is greater than a minimum value, said minimum value per unit of depth ranging between $0.1/\mu m$, when said birefringence gradient is present over 10% of the thickness of the film, and $0.01/\mu m$ when said birefringence gradient is present over the entire thickness of said film.

16. An optical device according to claim 1, including a stack of a plurality of said liquid crystal films, each of said films being arranged to reflect the light of a different wavelength band.

17. An optical device according to claim 1, including a reflective layer arranged, with respect to said film, on the opposite side to that of said incident light.

18. An optical device according to claim 1, forming a filter arranged to reflect said predetermined wavelength band or bands by said liquid crystal film or films and to let the rest of said incident light pass.

19. A method for manufacturing a Bragg reflection optical device for reflecting at least one predetermined wavelength band present in an incident light, the device including a film formed of a plurality of polymerised layers of cholesteric type liquid crystal, said method including the steps of:
  providing a substrate;
  depositing on a top surface of said substrate a first layer of polymerisable cholesteric liquid crystal having a first birefringence coefficient and reflecting a predetermined wavelength band, and polymerising said first layer; and
  depositing and polymerising, in succession on the preceding layer, superposed layers of polymerisable cholesteric liquid crystal reflecting said predetermined wavelength band and having respective birefringence coefficients which vary gradually with respect to that of the preceding layer, so as to form said film by a stack of layers together having a birefringence gradient in the thickness of said film.

20. A method for manufacturing a Bragg reflection optical device for reflecting at least one predetermined wavelength band present in an incident light, said method including the steps of:
  manufacturing a liquid crystal cell containing a film formed of a mixture comprising: an agent filtering ultraviolet radiation, a first cholesteric liquid crystal having a first birefringence coefficient and reflecting a predetermined wavelength band, and a second cholesteric liquid crystal having a second birefringence coefficient different from said first birefringence coefficient and reflecting said predetermined wavelength band; and
  generating polymerisation of the second liquid crystal in a top portion of said film by irradiating said mixture by ultraviolet radiation from a top face of said cell, so that said second liquid crystal is mostly fixed in said top portion by polymerisation and so that its concentration decreases with the depth in said film.

* * * * *